April 29, 1924.
H. W. CLARK
METER TESTER
Original Filed Nov. 20, 1918     2 Sheets-Sheet 1
1,492,205
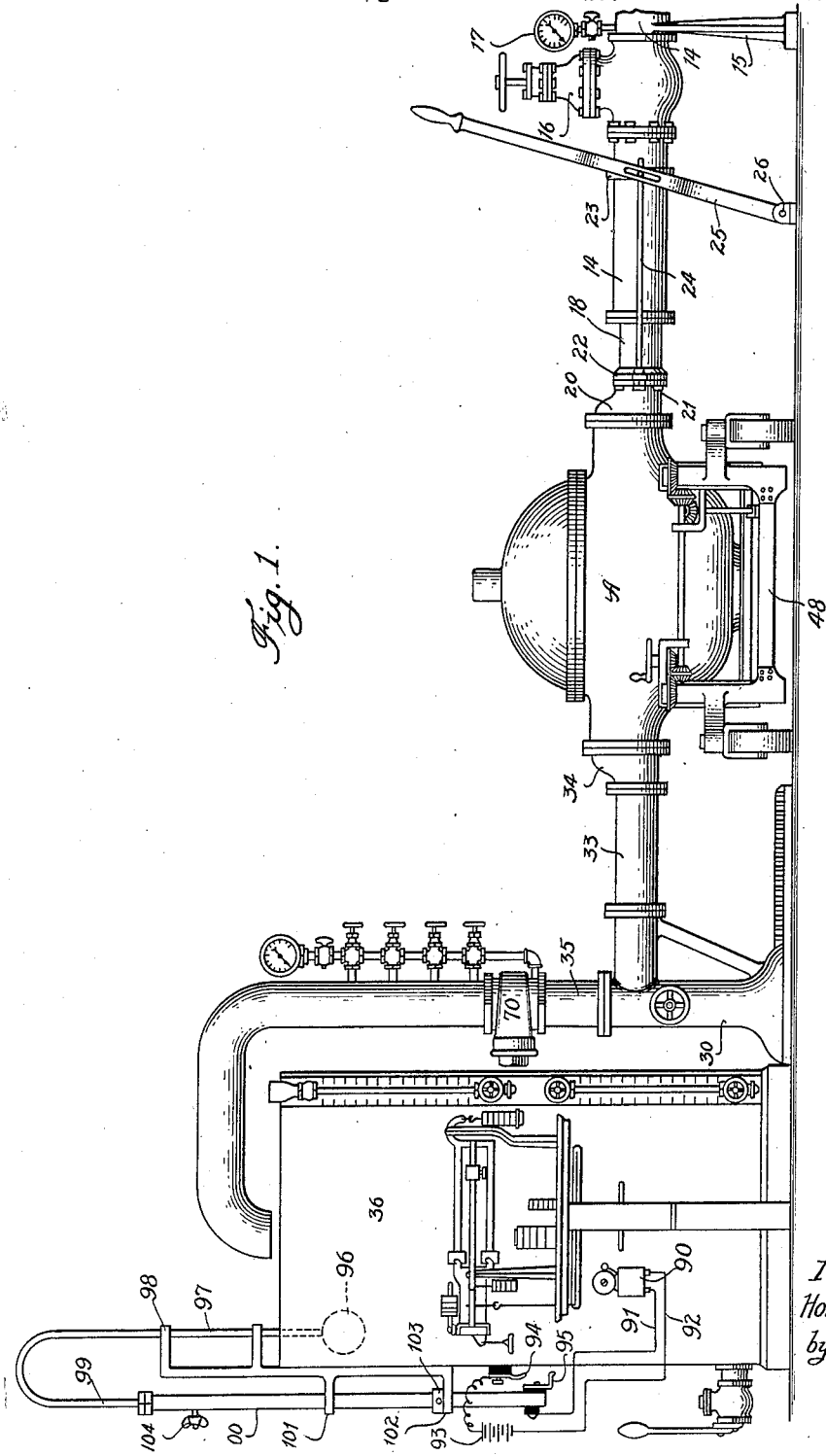
Inventor:
Horace W. Clark
by Fred Gerlach
his Atty.

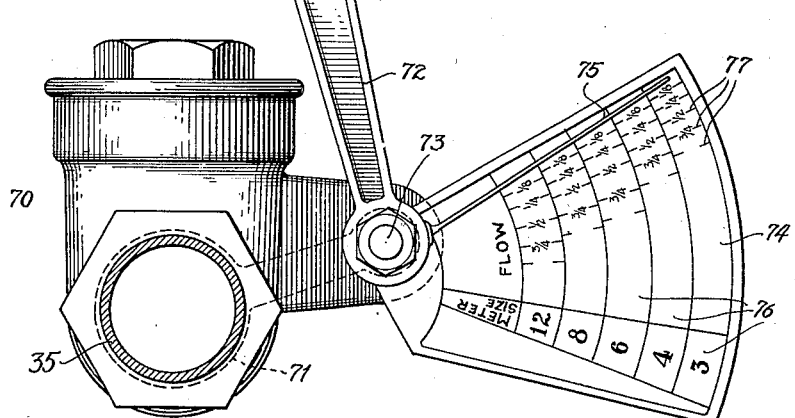
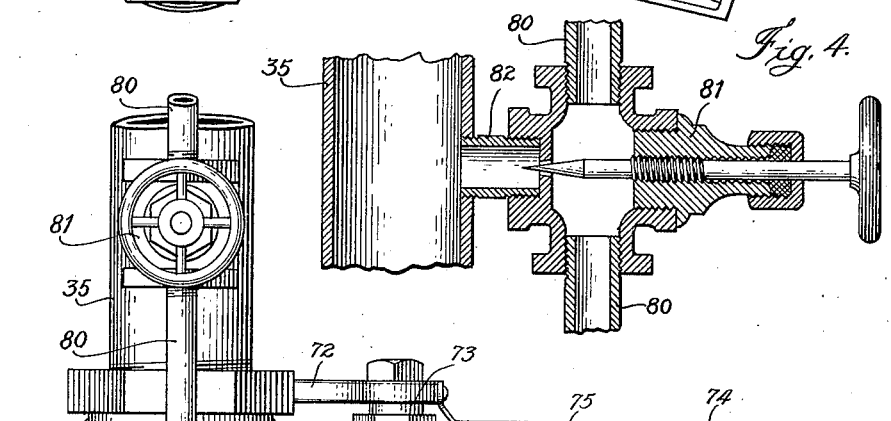
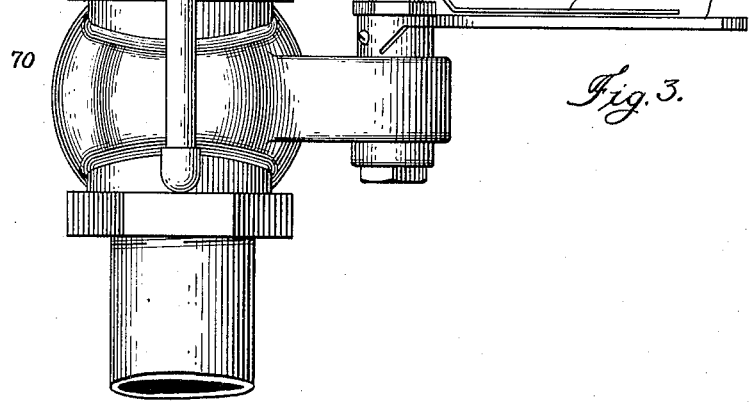

Patented Apr. 29, 1924.

1,492,205

UNITED STATES PATENT OFFICE.

HORACE W. CLARK, OF MATTOON, ILLINOIS, ASSIGNOR TO H. W. CLARK CO., OF MATTOON, ILLINOIS, A CORPORATION OF ILLINOIS.

METER TESTER.

Original application filed November 20, 1918, Serial No. 263,270. Divided and this application filed December 11, 1919. Serial No. 344,193.

*To all whom it may concern:*

Be it known that I, HORACE W. CLARK, a citizen of the United States, and a resident of Mattoon, in the county of Coles and State of Illinois, have invented certain new and useful Improvements in Meter Testers, of which the following is a full, clear, and exact description.

The invention relates to testers for fluid meters. This application is a division of Serial No. 263,270 filed by me November 20, 1918.

One object of the invention is to provide a tester with improved mechanism for making fractional flow tests and which is adapted for different sizes of meters, so that one tester may be used for fractional flow tests of meters of different sizes.

Further objects of the invention will appear from the detailed description.

The invention consists in the several novel features hereinafter set forth and more particularly defined by claims at the conclusion hereof.

In the drawings: Fig. 1 is a side elevation of a tester embodying the invention. Fig. 2 is a plan of the improved fractional flow valve. Fig. 3 is a side elevation of the same. Fig. 4 is a section through one of the sensibility test valves.

The improved tester comprises an inlet pipe 14 mounted upon a bracket 15 which may be secured to the floor or any suitable base. A suitable valve 16 is included in the inlet pipe 14 to control the flow of water to the tester. A pressure-gauge 17 is connected to the inlet pipe to indicate the pressure of the fluid therein. A pipe section 18 is slidably mounted in the inner end of the inlet-pipe 14 so that it may be adjusted into and out of connected relation with the inlet connection of a water-meter A. An adapter 20 is removably secured to a collar 22 fixed on the inner end of pipe-section 18. Different sizes of adapters may be secured to pipe 18 by bolts 21 to provide suitable connections with the inlet of meters of different sizes. A collar 23 formed of sections so it can be placed around pipe 14 is slidable on the outside of said pipe and is connected to the inner end of said pipe by rods 24. A lever 25 pivoted to a lug secured to the floor, as at 26, is adapted to shift pipe 18 and the adapter 20 and is suitably connected to collar 23.

The discharge-connection comprises a column 30 which is slidably mounted for adjustment to and from the meter and the range of movement provided for is sufficient to adapt the tester for connection to meters of many different sizes. This column has a duct therein communicating with pipe section 33. An adapter 34 is bolted to the inner end of pipe 33 and is suitably flanged so that it can be bolted to the discharge-connection of the meter A. A vertical pipe 35 is connected to the column 30 and the upper end of this pipe extends laterally and thence downwardly to discharge fluid into a suitable tank 36 wherein the fluid may be weighed or measured. This column and its connections may be quickly and bodily shifted to move the adapter 34 into or out of position for connection to the meter by means more fully set forth in said application No. 263,270.

The improved tester is designed for making tests of large sized meters, many of which are so heavy and cumbersome that they can be handled with difficulty and to provide for handling these meters with facility, a suitable truck 48 is provided on which the meter to be tested is placed, so that the meter can be readily shifted into position for connection to the inlet and outlet connections.

A valve 70 is included in the discharge pipe 35. This valve comprises a plate 71 which is movable across a seat on the inlet side of the valve-casing and a lever 72 on the outside of the valve-casing is secured to the stem 73 of the valve, so that the valve plate may be opened to any desired extent. Associated with the lever 72 is an indicator-plate 74. A pointer 75 is secured to the lever 72 and operated thereby according to the position of the valve 70. Indicator-plate 74 has a series of tables 76 thereon for the different sizes of meters for which the tester is adapted. Each of these tables 76 comprises a series of fractional indications 77 to indicate the fractional flow for a meter of the size for which the table is calculated. As a result of providing a valve of this type and this indicator, fractional flow tests of different sizes of meters may be made with a single valve and this is found to be an important and convenient advantage in meter-testing.

A branch-pipe 80 is connected to the discharge pipe 35 and a series of needle-point valves 81 of graduated or different sizes are included in said branch. Valves 81 control the flow of fluid through the discharge pipe or nipples 82 respectively which discharge into the column 35. These needle valves are employed to make sensibility tests, and in practice it has been found to be more efficient and accurate to employ a series of these needle valves, each permitting a small fixed rate of flow, in lieu of a multiple valve, because the flow of fluid cleans the needle point every time a valve is opened and because of the accuracy of flow controlled by needle-point regulation. It will be understood that these needle valves permit a flow corresponding to different sizes of openings for which sensibility tests are desired and that any desired number may be provided.

The operation of the improved tester will be as follows: When a meter is to be tested, the truck can be wheeled to a point where the meter is located, where the meter will be placed upon the platform of the truck. The latter will be wheeled into position between the inlet and discharge connections to bring the spuds on the meter into position for alignment with said connections. Next, the adapters 34 and 20 are bolted to the meter, and the parts will be in readiness for testing. By opening valve 16 and valve 70, the flow of fluid may be controlled through the discharge pipe 35 into tank 36, the discharge being weighed and measured in the tank, as well understood in the art. By manipulating the lever 72 into different positions, fractional flow tests may be made, different fractional flows for different sizes of meters being shown by the pointer 75 on the tables 76. For example, if a three-inch meter is being tested, the fractional flow permitted by the valve 70 will be indicated on the arcuate table 76 of indications 77 associated with meter size "3". All of the needle valves 81 will be normally closed. To make sensibility tests, valve 70 will be closed and then these valves 81 are successively opened to permit a small flow of known volume to pass through the needle-valve. The result of the tests may be ascertained by measuring or weighing the fluid which has passed to the tank 36.

In practice, it has been found, particularly when making a sensibility test which extends over a long period of time, that the operator, in attempting to do other work, will not be present at the proper time to close and note the record, and for the purpose of signaling the operator that the close of the test is approaching, an automatic signaling device is provided. This consists of an electric bell 90 or other suitable signal conveniently located which is operated by an electric circuit, including conductors 91 and 92, a battery 93 and a switch comprising a stationary contact 94 and a movable contact 95. The movable contact is adapted to be operated to close the circuit by a float 96 which is disposed in the tank 36 and secured to a rod 97 which is guided vertically in a bracket 98. Rod 97 extends upwardly above the tank and has a downwardly extending member 99 which is adjustably secured in a pipe or sleeve 100 which is guided vertically in lugs 101 and 102 and to the lower end of which the switch 95 is secured. A stop 103 normally rests on lug 102 to support the float and its operating connections in desired position, so that the float will be lifted by the rising water in the tank as the close of the test is approaching. A thumb-screw 104 in the sleeve 100 is adapted to secure the member 99 and the sleeve together, so that the float 96 will be positioned at the desired elevation according to the test being made. In operation, the float 96 will be set so that it will be operated a short time before the water in the tank 36 rises to the point when the test will be concluded, and as a result, the float will, prior to the closing of the test, lift the rod 97 and sleeve 100 and the switch 95 will close the circuit for the signalling device 90, so that the operator will have time to come to the tester before the close of the test.

The invention thus exemplifies an improved meter tester which includes a single valve whereby fractional flow tests may be made with meters of different sizes.

The invention is not to be understood as restricted to the details set forth, since these may be modified within the scope of the appended claim, without departing from the spirit and scope of the invention.

Having thus described the invention, what I claim as new and desire to secure by Letters Patent, is:

A meter tester which is provided with a measuring valve, a pointer attached thereto, and fractional indicating tables adapted to co-operate with said pointer and display the fractional flow which was taking place from the meter under testing.

HORACE W. CLARK.